United States Patent [19]
Orii et al.

[11] Patent Number: 5,483,849
[45] Date of Patent: Jan. 16, 1996

[54] GOVERNOR WITH PULLEY

[75] Inventors: Makoto Orii; Teruaki Imai, both of Nagano, Japan

[73] Assignee: Sankyo Seiki Mfg. Co., Ltd., Nagano, Japan

[21] Appl. No.: 20,648

[22] Filed: Feb. 22, 1993

[30] Foreign Application Priority Data

Feb. 24, 1992 [JP] Japan .................. 4-007962 U

[51] Int. Cl.⁶ .................. G05G 1/08; B60T 8/72
[52] U.S. Cl. .................. 74/506; 74/501.5 R; 74/505; 188/184; 188/185
[58] Field of Search .................. 74/504–506, 501.5 R, 74/500.5, 508; 188/184, 185

[56] References Cited

U.S. PATENT DOCUMENTS

| | | | |
|---|---|---|---|
| 3,110,380 | 11/1963 | Meyer et al. | 74/506 X |
| 3,625,077 | 12/1971 | Bernard et al. | 74/506 X |
| 3,750,488 | 8/1973 | McClure | 74/508 X |
| 4,085,629 | 4/1978 | Fogarollo | 74/506 X |
| 4,529,148 | 7/1985 | Hesprich et al. | 74/506 X |
| 4,615,234 | 10/1986 | Chevance et al. | 74/506 X |
| 4,628,759 | 12/1986 | Kobayashi et al. | 74/501.5 R |

FOREIGN PATENT DOCUMENTS

| | | | |
|---|---|---|---|
| 58-94665 | 6/1983 | Japan | 74/506 |
| 63-25867 | 2/1988 | Japan . | |
| 5-39044 | 2/1993 | Japan | 74/506 |
| 5-65067 | 3/1993 | Japan | 74/506 |
| 87/00436 | 6/1988 | WIPO | 74/506 |

*Primary Examiner*—Vinh T. Luong
*Attorney, Agent, or Firm*—McAulay Fisher Nissen Goldberg & Kiel

[57] ABSTRACT

A governor is provided with a pulley comprising a casing, a pulley rotatably supported by the casing and a long member wound around the pulley. The pulley is rotated when the long member is pulled. A spring member is provided for urging the pulley in the direction in which the long member is wound up. A braking device is provided for braking the pulley when the long member is pulled. A long member winding up portion is formed in the pulley so that winding up diameters thereof change as the long member is being pulled out which, in turn, changes the operation of the braking device.

7 Claims, 9 Drawing Sheets

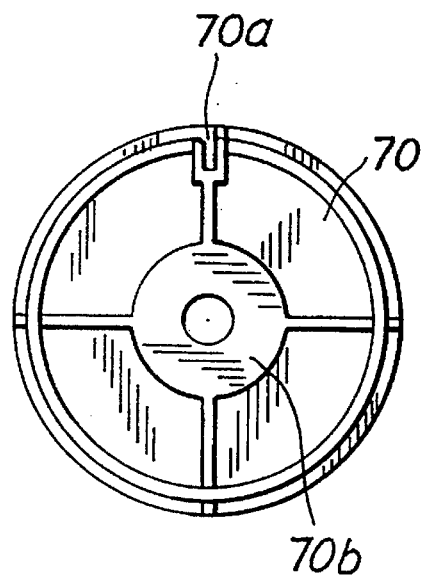
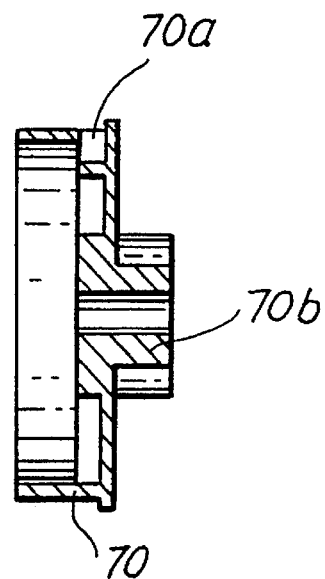
FIG.4A  FIG.4B
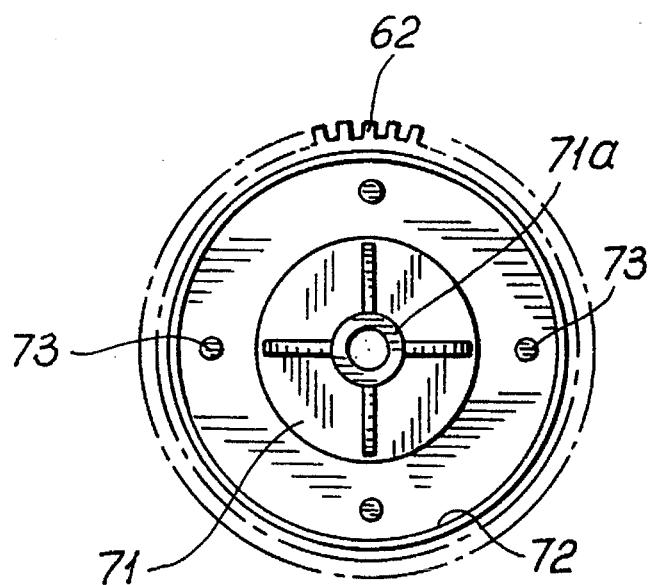
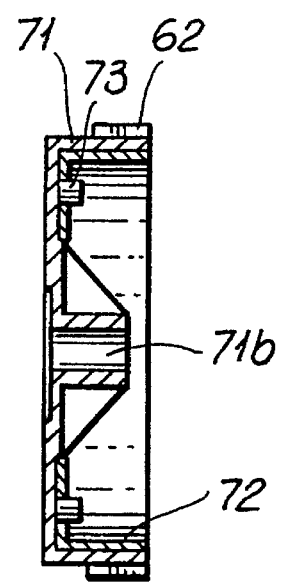
FIG.4C  FIG.4D

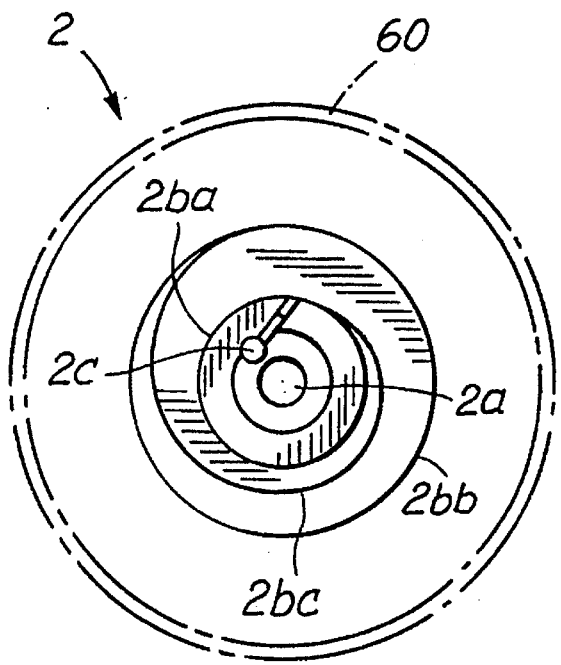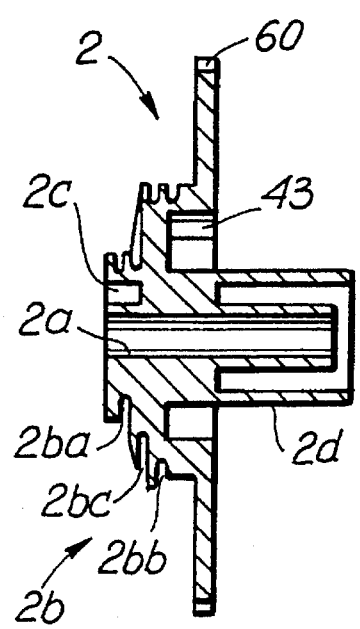
FIG.11A    FIG.11B
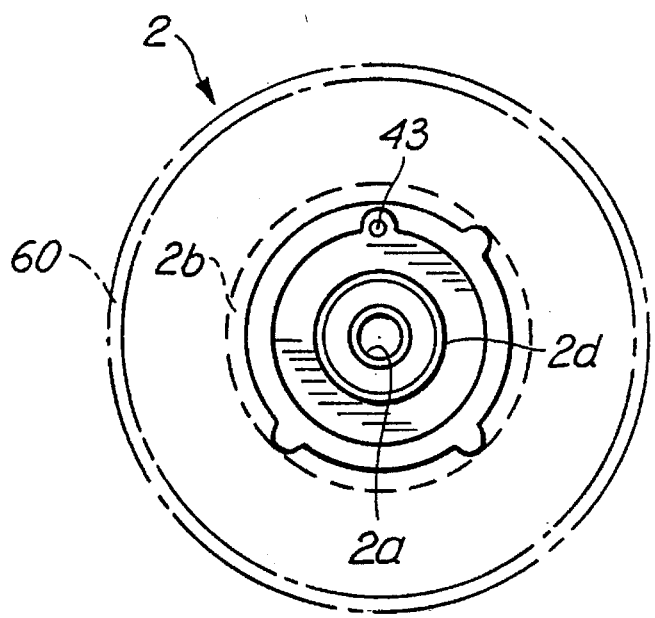
FIG.11C

GOVERNOR WITH PULLEY

BACKGROUND OF THE INVENTION a) Field of the Invention

The present invention relates to a governor provided with a pulley for controlling the speed of a movable body slowly.

b) Background Art

An example of a movable body whose moving speed is to be controlled slowly is a travelers'baggage shelf of an airplane. With reference to FIG. 12, a governor for controlling the moving speed of a baggage shelf will be described hereinbelow. A baggage shelf 100 is pivotally supported by a frame attached to an airplane ceiling (not shown) via an axle 101. The baggage shelf 100 is pivotally movable between the upper storage position as shown by the solid lines and the lower position as shown by dot-dot-dashed lines, and moved downward to the lower position by its weight when a latch mechanism (not shown) is released.

To the baggage shelf 100, one end 103a of a wire (a long member) 103 pulled out from a governor 102 fixed to the frame body is connected. The other end (not shown) of the wire 103 is reeved around a pulley 104 provided for the governor 102. The governor 102 provided with a pulley is disclosed in Japanese Published Unexamined (Kokai) Utility Model Application No. 6325867.

The prior art governor includes a pulley around which a wire is reeved, a speed up gear train for increasing the speed of the pulley when the wire is pulled, and braking means for braking the speed up gear train to control the let out speed of the wire, that is the speed of the movable body. The braking means is compose of a friction member which expands when rotated, and a circumferential wall for applying a brake force to the friction member in contact with the friction member.

When the latch mechanism of the baggage shelf 100 is released at the storage position, the shelf 100 is pivoted down to the lower position as shown by the dot-dot-dashed lines by pulling out the wire 103 from the governor 102 by the weight of the shelf 100. When the wire 103 is being pulled out, the pulley 104 is rotated. In this case, a brake force is applied to the rotating pulley 104 by the braking means via the speed up gear train. That is, immediately after the shelf 100 starts to drop, the shelf 100 is pivoted downward at a relatively high speed to a brake start position a at which the brake is applied. After that, however, the shelf 100 pivots at a relatively slow speed down to the full pivotal position.

The governor provided with a pulley has been explained by taking the case of application to a travelers'shelf of an airplane. Without being limited thereto, the governor of this type can be applied to a movable body (e.g. a pivotal shelf) used in a kitchen, an office room, etc.

The above-mentioned governor has an advantage of being free from oil leakage because no hydraulic device is used. However, since the speed up gear train composed of a plurality of gears of multiple stages is used to increase the rotational speed of the pulley and further to transmit the increased speed to the braking means, there exist problems in that the number of parts is large, the structure is rather complicated, and therefore the cost thereof is high. In addition, since the pivotal speed of the baggage shelf is roughly constant from the time a braking force is applied to when the shelf is completely pivoted open, there exists another problem in that the feeling of the downward motion of the shelf is not preferred. In other words, it is preferred to realize such an brake application process where the shelf is pivoted down at a relatively high speed midway but at a slow speed near the full open position, even when a braking force is applied to the shelf.

OBJECT AND SUMMARY OF THE INVENTION

Accordingly, a primary object of the present invention is to provide a governor with a pulley which is excellent in brake feeling, simple in structure, and low in cost.

In accordance with the invention, a governor provided with a pulley comprises a casing and a pulley rotatably supported by the casing. A long member is wound up around the pulley and the pulley is rotated when the long member is pulled. A spring member urges the pulley in the direction in which the long member is wound up. Braking means are provided for braking the pulley when the long member is pulled. A long member winding portion is formed in the pulley so that winding up diameters thereof change as the long member is pulled out.

For a better understanding of the present invention, reference is made to the following description and accompanying drawings while the scope of the invention will be pointed out in the appended claims.

BRIEF DESCRIPTION OF THE DRAWINGS

FIG. 4(a) is a rear view showing the drive sleeve of the one-way clutch: FIG. 4(b) is a cross-sectional view showing the same; FIG. 4(c) is a front view showing the driven sleeve; and FIG. 4(d) is a cross-sectional view showing the same;

FIG. 11(a) is a rear view showing the pulley formed with the long member winding up portion; FIG. 11(b) is a cross-sectional view showing the same; and FIG. 11(c) is a front view showing the same;

DESCRIPTION OF THE PREFERRED EMBODIMENTS

Figure 1:
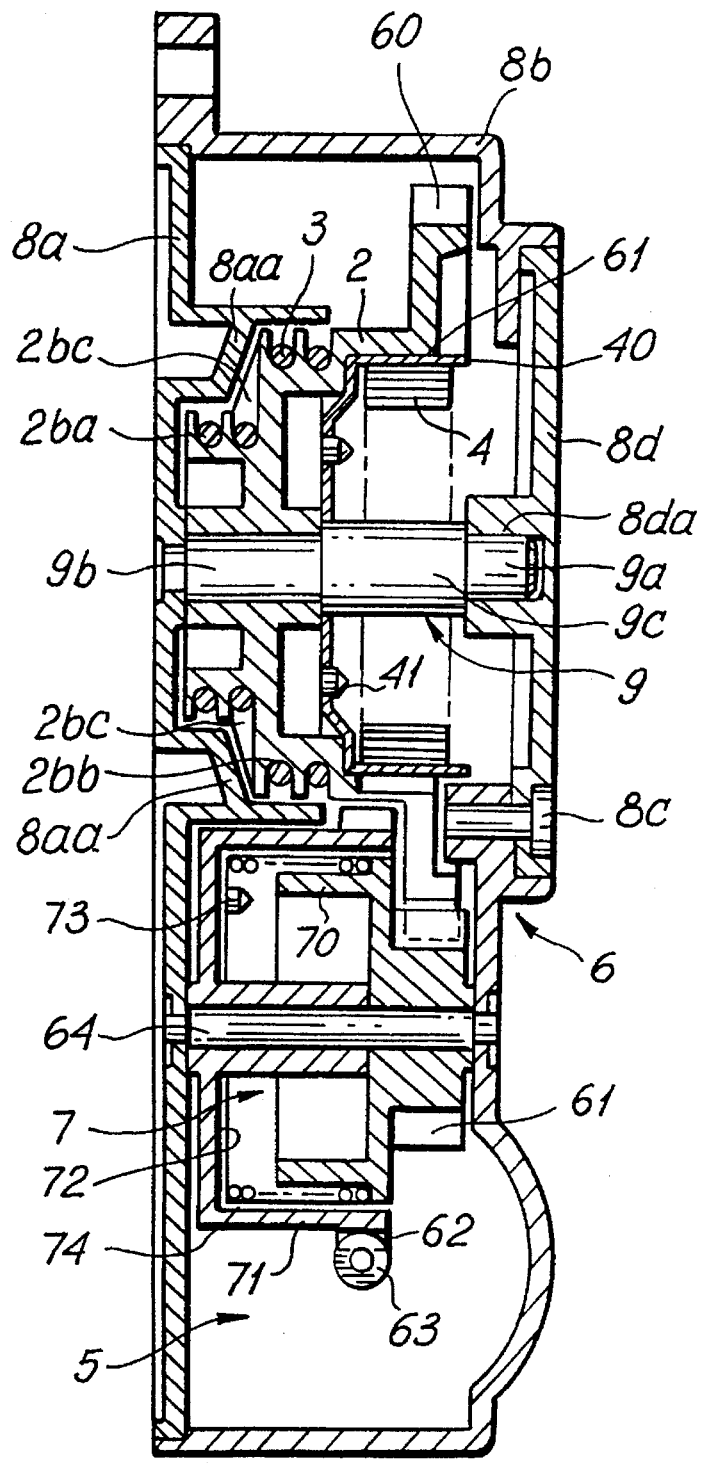
FIG. 1 is a cross-sectional view showing a first embodiment of the governor provided with a pulley of the present invention.
Figure 2:
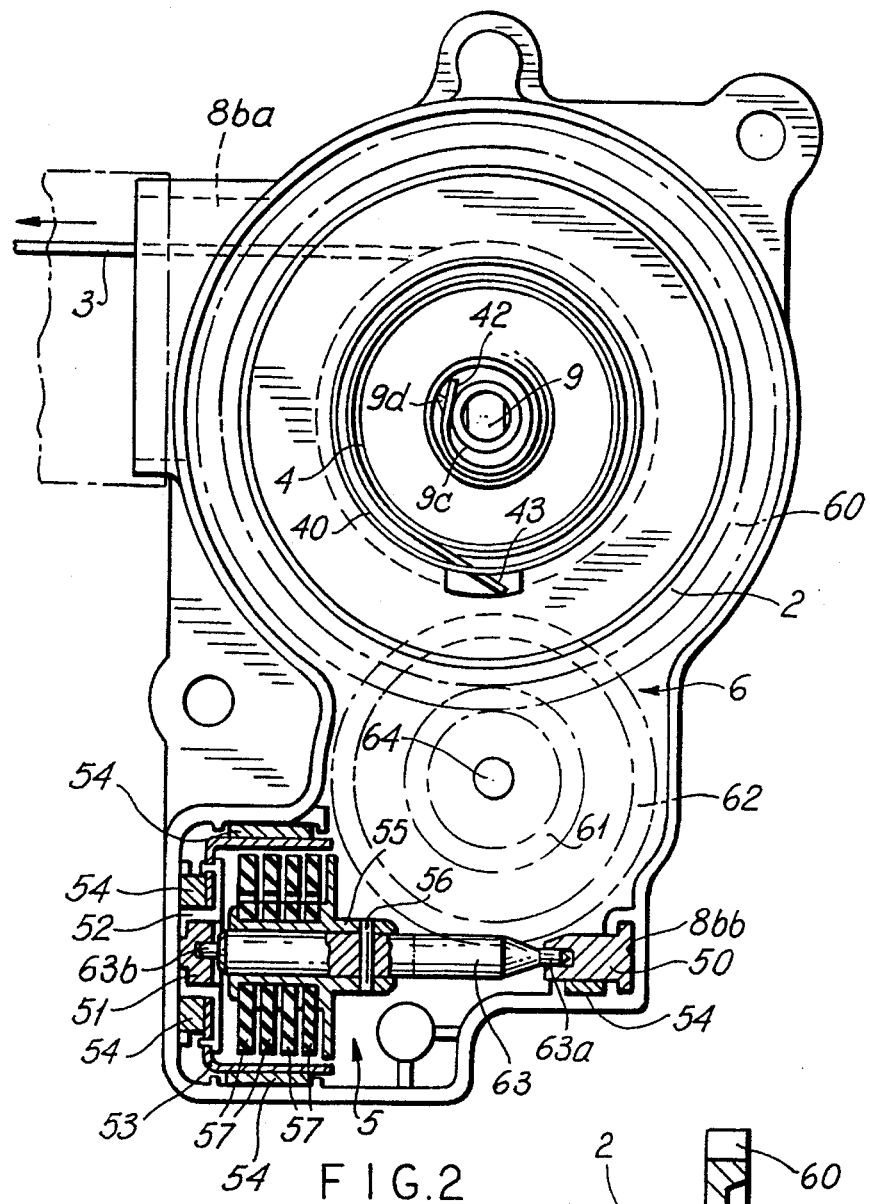
FIG. 2 is a cross-sectional plane view showing the inner structure of the same embodiment.

A first embodiment of the present invention will be described hereinbelow with reference to the attached drawings. In FIGS. 1 and 2, the reference numeral 1 denotes a governor provided with a pulley of the first embodiment, which comprises a pulley 2 rotatably supported by a casing, a wire (a long member) 3 reeved around the pulley 2, a spiral spring 4 (a spring member) for urging the pulley in the direction that the wire 3 is wound around the pulley 2, and frictional braking means 5 for applying a braking force to the pulley 2. Between the braking means 5 and the pulley 2, there are disposed a speed up gear train 6 for transmitting the pulley rotation to the braking means 5, and a one-way clutch 7 for regulating the transmission direction of the rotating gear train to a predetermined direction. A material not expandable and contractible is selected as the material of the wire 3.

The casing is composed of a first casing 8a, a second casing 8b fixed to the first casing 8a so as to be joined together, and a casing lid 8d fixed to the second casing 8b with screws 8c. A support axle 9 is supported between the first casing 8a and the casing lid 8d. One end 9a of this axle 9 is fixedly fitted to a fitting hole 9da formed in the casing lid 8d.

A pully 2 made of a synthetic resin is rotatably supported at a small diameter portion 9b of the support axle 9. The pulley 2 is formed with a large diameter gear 60 integral therewith so as to constitute the first stage of the speed up gear train 6. The structure of the pulley 2 will be described with reference to FIG. 3. The pulley 2 is formed with a hole 2a through which the support axle 9 is passed, and a spiral groove 2b extending along a virtual spiral (a long member winding up portion) around which the wire 3 is to be wound.

As shown in FIG. 11(a), the pulley 2 is formed with an engage portion 2c communicating with one end of the spiral groove 2b, with which one end portion 3(a) (see FIG. 8) of the wire 3 is engaged. The spiral groove 2b is so formed that the diameter changes from the small diameter portion 2ba (the engage portion 2c at which the wire winding starts) to the maximum diameter portion 2bb. In the case of the spiral groove 2b shown, the small diameter portion 2ba corresponds to two winding portions when counted from the wire winding start, and the large diameter portion 2bb corresponds to two maximum winding portions when counted from the wire winding end. The portion between the small and large diameter portions 2ba and 2bb is a conical diameter winding portion 2bc whose diameter changes relatively greatly and which is formed so as to communicate between both the portions 2ba and 2bb.

As shown in FIG. 1, the first casing 8(a) is formed with a wire guide 8aa in the close vicinity of the outer circumference of the pulley 2. This wire guide 8aa is formed so as to close the opening portion of the groove 2b for prevention of the wire 3 from being removed from the spiral groove 2b.

Figure 12:
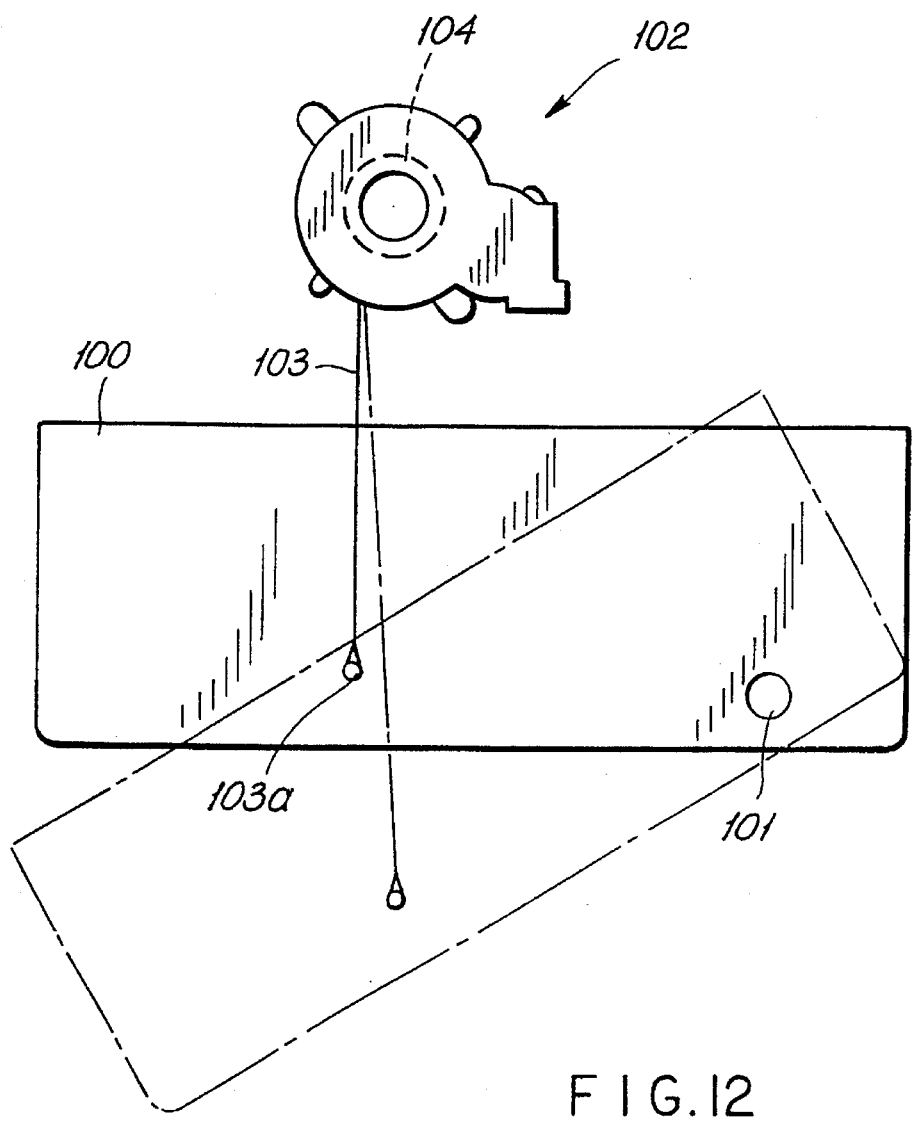
FIG. 12 is a diagrammatical side view showing the baggage shelf as an example of the movable body to which the present invention is applied.

The other end of the wire 3 is led out from the wire let out portion 8ba (see FIG. 2) of the casing and connected to the baggage shelf 100, as shown in FIG. 12. When the baggage is placed on the shelf, a part of the wire 3 slightly longer than the movement length of the shelf is wound around the pulley 2.

A metallic cup 40 is fitted to a hollow portion 61 of the large diameter gear 60 and located in position by a pin 41 projecting from the end surface of the hollow portion 61. In FIG. 2, an engage projection 9d is formed in the large diameter portion 9c of the support axle 9 so as to be engaged with an inner end 42 of the spiral spring 4. Further, an outer end 43 of the spiral spring 4 is engaged with an engage portion formed in the cup 40. The winding direction of the spiral spring 4 is such that the spiral spring 4 is wound up by the pulley 2 rotating in the counterclockwise direction when the wire 3 is pulled out. The wire 3 urged by the spiral spring 4 in the direction that the wire is wound up around the pulley 2, when the casing lid 8d (to which the support axle 8 is fitted) is rotated a few turns in the spiral spring winding up direction and then fixed to the second casing 8b.

The speed up gear train 6 is composed of a large diameter gear wheel 60 (as the first stage), a small diameter drive gear wheel 61 in mesh with the gear wheel 60, a worm wheel 62 (a driven gear wheel) selectively coupled via a one-way latch 7, and a worm axle 63 rotating in mesh with the worm wheel 62. Since the lead angle of this worm axle 63 is formed sufficiently large, the worm axle 63 is rotated by the worm wheel 62 rotated when the wire is pulled out. The drive gear 61 and the worm wheel 63 are supported by a support axle 64 supported by the casing so as to be rotatable relative to each other.

As shown in FIGS. 1 and 4, the drive gear wheel 61 is formed with a drive sleeve 70 integral therewith, and loosely fitted to a driven sleeve 71 formed in the worm wheel 62 integral therewith. Within the driven sleeve 71, a metallic cup. 72 is fitted and located in position by a pin 73. In an annular space formed between both the sleeves 70 and 71, a coil spring 74 is disposed having a diameter larger than that of the inner diameter of the cup 72. The coil spring 74 is set within the cup 72, after the diameter thereof is reduced. The one end of the coil spring 74 is engaged with an engage portion 70a formed in the drive sleeve 70, and the coil portion of the coil spring 74 is in contact with the inner circumferential surface of the cup 72 in the expanded condition. The other end of the spring 74 is left free.

When the wire 3 is pulled out and therefore the drive sleeve 70 is rotated, the coil spring 74 is wound off open into pressure contact with the inner circumferential surface of the cup 72, so that the driven sleeve 71 is rotated. The rotational direction of the drive gear wheel 61 obtained when the wire 3 is wound up around the pulley 2 is the direction that the coil spring 74 is wound up, that is, the coil spring 74 is moved away from the inner circumferential surface of the cup 72, so that the rotational force of the coil spring 74 is not transmitted to the cup 72. The one-way clutch shown is a spring clutch. Without being limited thereto, it is of course possible to use a clutch of any type, as long as the clutch provides means for transmitting a rotational force only in one direction. Further, in FIG. 4, the reference numerals 70b and 71a denote boss portions into which the support axle 64 is inserted.

Figure 5:
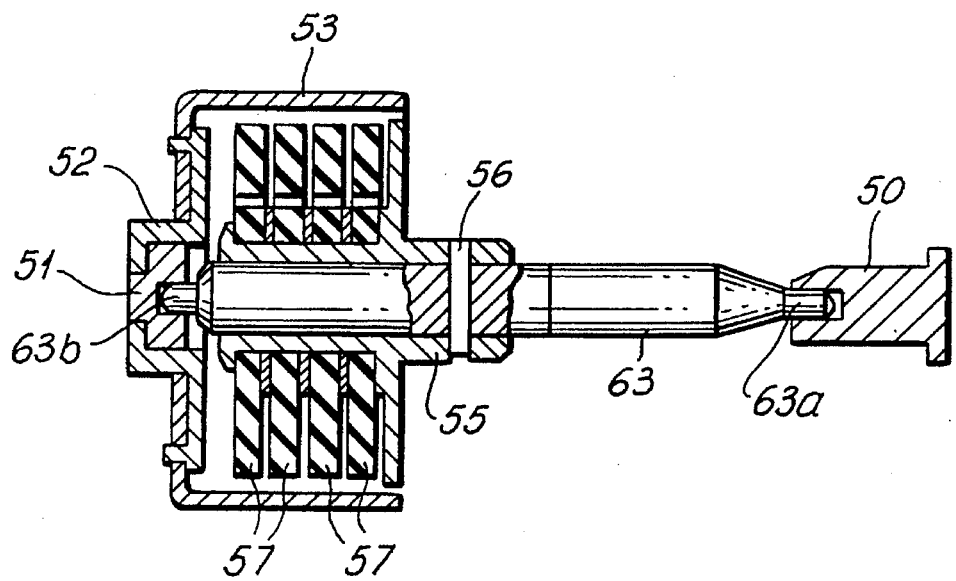
FIG. 5 is a cross-sectional view showing an example of the frictional braking means.

With reference to FIGS. 2 and 5, an example of the braking means is explained. The worm axle 63 is rotatably supported by bearings 50 and 51 at both small diameter end portions 63a and 63b thereof. The bearing 50 is held being fitted to a holding portion 8bb formed in the second casing 8b. The bearing 51 is held by a cup holder 52 supported by the second casing 8b so as not to be rotated.

The cup holder 52 is a metallic cup for supporting a brake cup 53 enclosing the one end of the worm axle 63. A vibration absorbing member 54 is provided between the axle 50 and the casing and between the cup 53 and the casing. A friction plate holder 55 is fitted to the worm axle 63, and further fixed to the axle 63 by a pin 56 pressure fitted to the axle 63. A plurality of friction plates 57 formed of elastic material such as rubber, for instance are pressure fitted to the friction plate holder 55.

Figure 6:
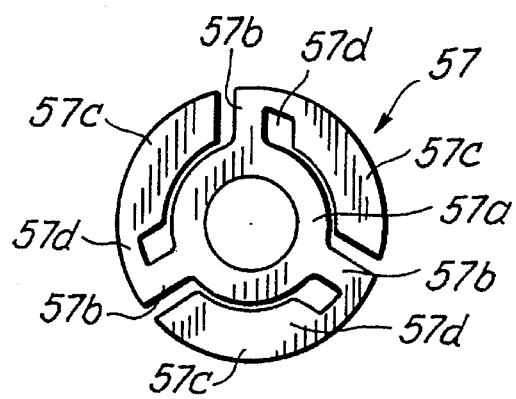
FIG. 6 is a side view showing an example of the friction plate.

As shown in FIG. 6, the friction plates 57 are formed with arm portions 57b extending radially from a center portion 57a pressure fitted to the worm axle, and friction portions 57c extending from the arm portions in the same circumferential direction, respectively. When the worm axle 63 rotates at a high rotational speed, narrow portions 57c of the friction plate 57 are deformed radially outwardly due to a centrifugal force into contact with the inner circumferential surface of the brake cup 53, so that a braking force is applied to the worm axle 63 and further the gear train connected to the worm axle 63. Another braking means can be adopted, as described later.

The operation of the first embodiment thus constructed will be described hereinbelow.

With reference to FIGS. 1 and 2, when the baggage shelf 100 (see FIG. 12) is pivoted downward, the wire 3 is let out from the casing. The let out wire 3 rotates the pulley 2 to wind up the spiral spring 4. In other words, the energy is accumulated. On the other hand, the large diameter gear wheel 60 formed integral with the pulley 2 rotates the small diameter gear wheel 61 in mesh therewith at a higher speed, so that the drive sleeve 70 is rotated. The rotational direction of the drive sleeve 70 ais the direction that the coil spring 74 is widened open, so that the coil spring 74 is brought into contact with the inner circumferential surface of the cup 72 to drive the driven sleeve 71 under the clutch engage condition. Once the driven sleeve 71 is rotated, the worm wheel 62 formed integral. with the driven sleeve 71 rotates the worm axle 63 at a high speed.

When the worm axle 63 rotates, the friction plates 57 fixed to the worm axle 63 expand radially outward due to the centrifugal force thereof, so that the friction portions 57c (see FIG. 6) are brought into frictional contact with the cup 54 to apply a braking force to the worm axle 63. When the rotational speed of the worm axle 63 is reduced down and therefore the centrifugal force becomes small, the friction plates 57 are brought away from the cup 54 to interrupt the frictional braking force. However, if the rotational speed increases, the friction portions 57c are again brought into frictional contact with the cup 54 to apply a braking force to the worm axle 63. The generation and interruption of the braking force by the friction plates 57 are repeated at an extremely short time period. The braking force generated by the braking means increases with increasing rotational speed worm axle 63.

On the other hand, when the baggage shelf 100 is lowered open, the wire 3 is pulled and therefore the pulley 2 is rotated. In this case, the diameter of the pulley 2 around which the wire 3 is wound decreases with the increasing length of the wire 3 pulled out, so that the change in the wire winding diameter varies the opening speed of the baggage shelf 100 as shown by solid lines in FIG. 13.

Figure 3:
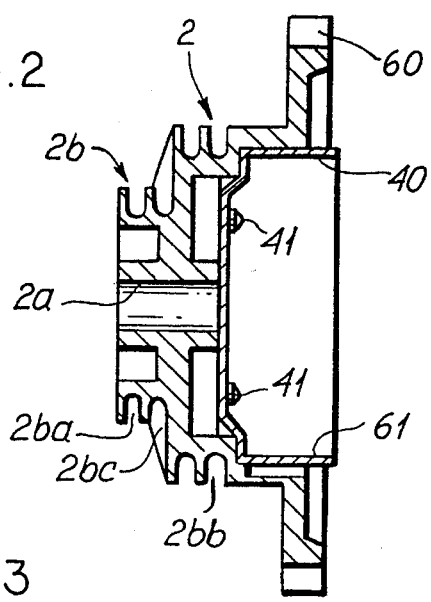
FIG. 3 is a cross-sectional view showing the structure of the pulley along the same section as FIG. 1.

In more detail, in FIG. 3, immediately after the latch has been released, since the braking force of the braking means 5 is small, the baggage shelf 100 is pivoted at a high speed. However, when the baggage shelf 100 has been pivoted to the brake start position a at which the braking means 5 starts to actuate, the shelf 100 pivots at a lower speed V1. This speed V1 is produced when the braking force is generated by the braking means 5, under the condition that the wire 3 wound around the winding diameter portion 2bb (see FIG. 3) rotates the pulley 2.

Further when the let out wire 3 rotates the pulley 2 via the conical diameter portion 2bc, since the wire winding diameter is slightly reduced, the pulley 2 is rotated at another higher speed. Therefore, the rotational speed of the large diameter gear wheel 60 of the first stage of the speed up gear train 6 increases, so that the worm axle 63 of the final stage rotates at a higher speed. Accordingly, a larger braking force is applied to the axle 63, with the result that the baggage shelf 100 is pivoted at a further lower speed V2. This speed V2 is produced when the braking force is generated by the braking means 5, under the condition that the wire 3 wound around the smaller winding diameter portion 2ba (see FIG. 3) rotates the pulley 2.

When the let out wire 3 rotates the pulley 2 via the smaller diameter portion 2ba, the rotational speed of the large diameter gear wheel 60 of the first stage of the speed up gear train 6 becomes the maximum, so that the worm axle 63 is rotated at a further another higher speed, so that the period of the frictional contact between the friction plates 57 and the cup 72 is extremely shortened and therefore a larger braking force is generated. The baggage shelf 100 is pivoted open at this speed. V2 down to its full open position.

Further, in the above-mentioned embodiment, the spiral groove 2b of the pulley 2 around which the wire 3 is wound is composed of the large diameter portion 2bb, the small diameter portion 2ba and the conical diameter portion 2bc connecting both, so that braking force can be generated in stepwise fashion. Without being limited thereto, however, it is unnecessary to keep the speed V1 constant beginning from the brake start position a; that is, it is possible to reduce the speed gradually by changing the diameter of the pulley. In this case, however, since it is preferable that the baggage shelf 100 is pivoted open at a slow speed immediately before being stopped, it is preferable to form the small diameter portion 2ba so as to have the same diameter to some extent.

Figure 13:
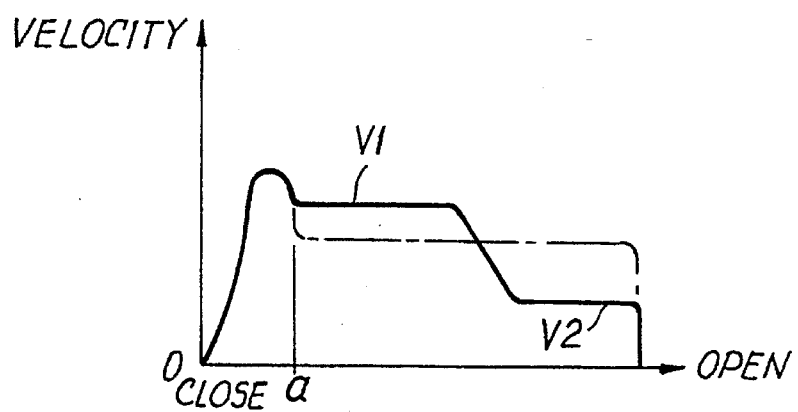
FIG. 13 is a diagram for assistance in explaining the relationship between the movement speed and the movement position of the movable body of the governor provided with a pulley according to the present invention, in comparison with the prior art governor provided with a pulley.

As shown by the solid lines in FIG. 13, immediately after the latch is released, since no braking force is applied, the baggage shelf 100 is pivoted open at a high speed . However, since the first stage braking force is applied, the shelf 100 is pivoted at a relatively high speed. Thereafter, since a large braking force is applied to the shelf 100 midway, the shelf 100 is pivoted open at a slow speed. In summary, the baggage shelf 100 is pivoted open first quickly, but slowly midway.

This pivotal motion of the baggage shelf can improve the feeling of the pivotal motion of the shelf. In FIG. 13, for instance, when the baggage shelf is pivoted open at the speed V1 from beginning to end, the downward moving speed of the shelf is too fast, so that there exists a danger that the shelf strikes against the hand or the head of the traveller. On the other hand, when the shelf is pivoted open at the speed V2, since the downward moving speed of the shelf is too slow, the traveller may pull down the shelf by force. However, if the pivotal speed of the baggage shelf changes in such a way as to be reduced as the shelf reaches the full open position, it is possible to solve the above-mentioned problems.

The operation of raising the baggage shelf 100 lowered as shown by dot-dot-dashed lines in FIG. 12 will be described. When the baggage shelf is pivoted upward in the closed direction, no pulling force is applied to the wire 3, so that the let out wire 3 is wound around the pulley 2 urged by the spiral spring 4 wound up. In other words, the accumulated energy is released. At this moment, the large diameter gear wheel 60 formed integral with the pulley 2 rotates the drive gear 61 at a high speed. In this case, since the drive sleeve 70 formed integral with the drive gear wheel 61 rotates in the direction that the coil spring 74 is wound up, the spring 74 is brought away from the inner circumferential surface of the cup 72 without rotating the driven sleeve 71, with the result that the rotational force transmission of the speed up gear train 6 is interrupted by the one-way clutch 7. Therefore, no braking force of the braking means 5 is applied when the wire 3 is being wound up, so that the baggage shelf can be pivoted closed without any load.

In the case where the speed at which the wire is wound up is slower than the speed at which the baggage shelf is closed, although the wire 3 is deformed in the radially outward direction, since the wire guide 8aa is provided in the vicinity of the outer circumference of the pulley 2, the wire 3 will not be removed from the wire winding diameter portion.

A second embodiment of the present invention will be described hereinbelow.

Figure 8:
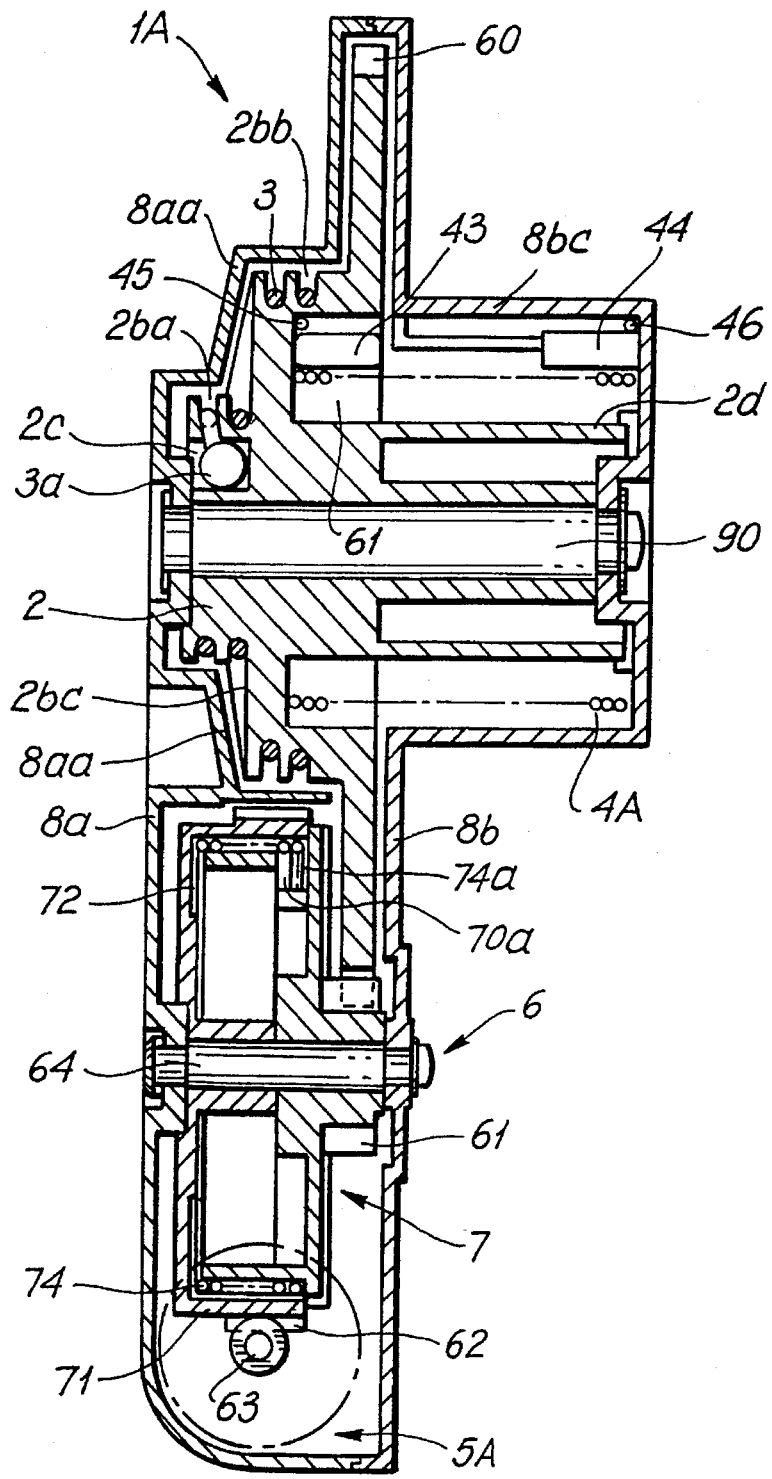
FIG. 8 is a cross-sectional view showing a second embodiment of the governor provided with a pulley according to the present invention.
Figure 9:
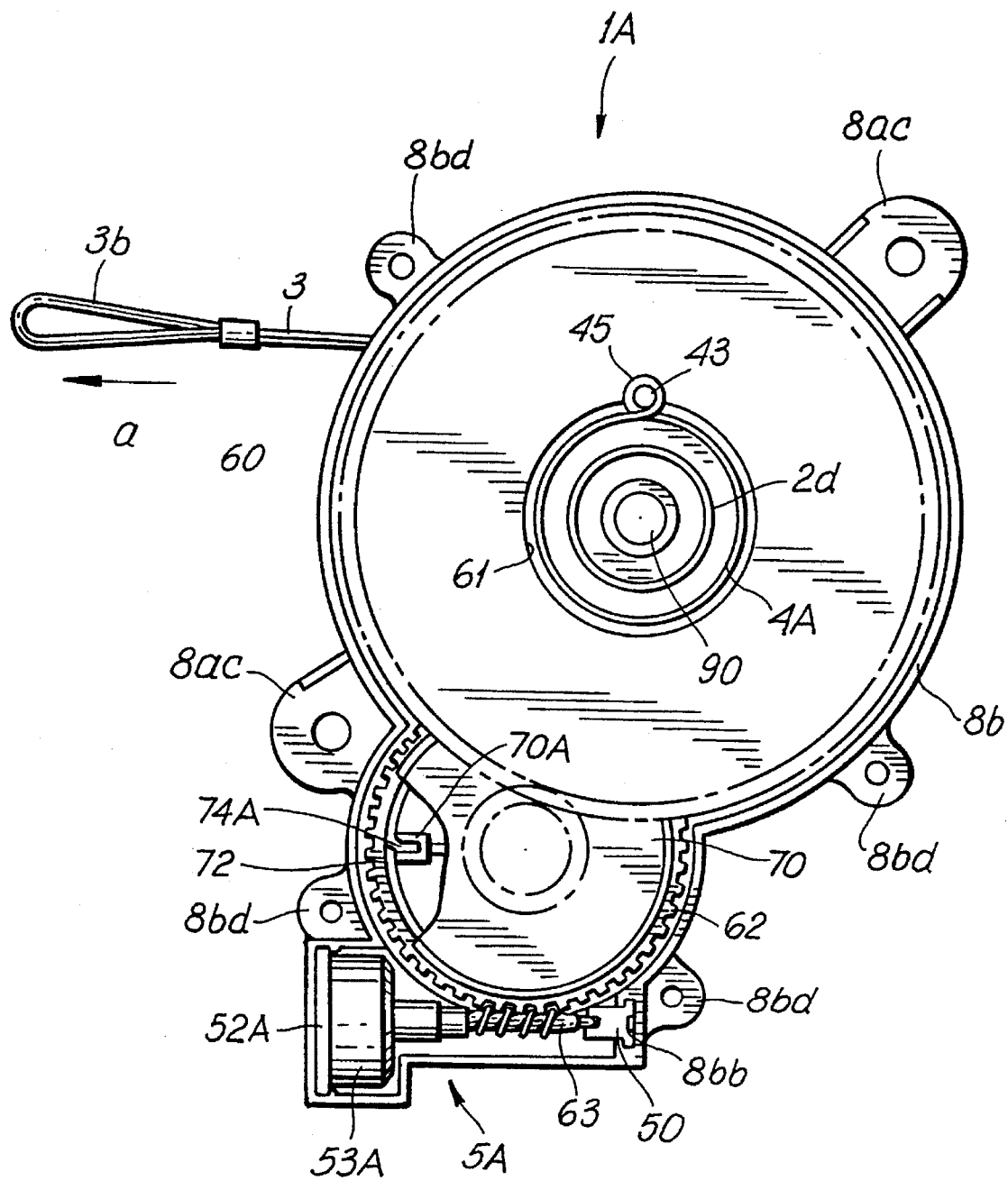
FIG. 9 is a front view showing the inner portion thereof.
Figure 10:
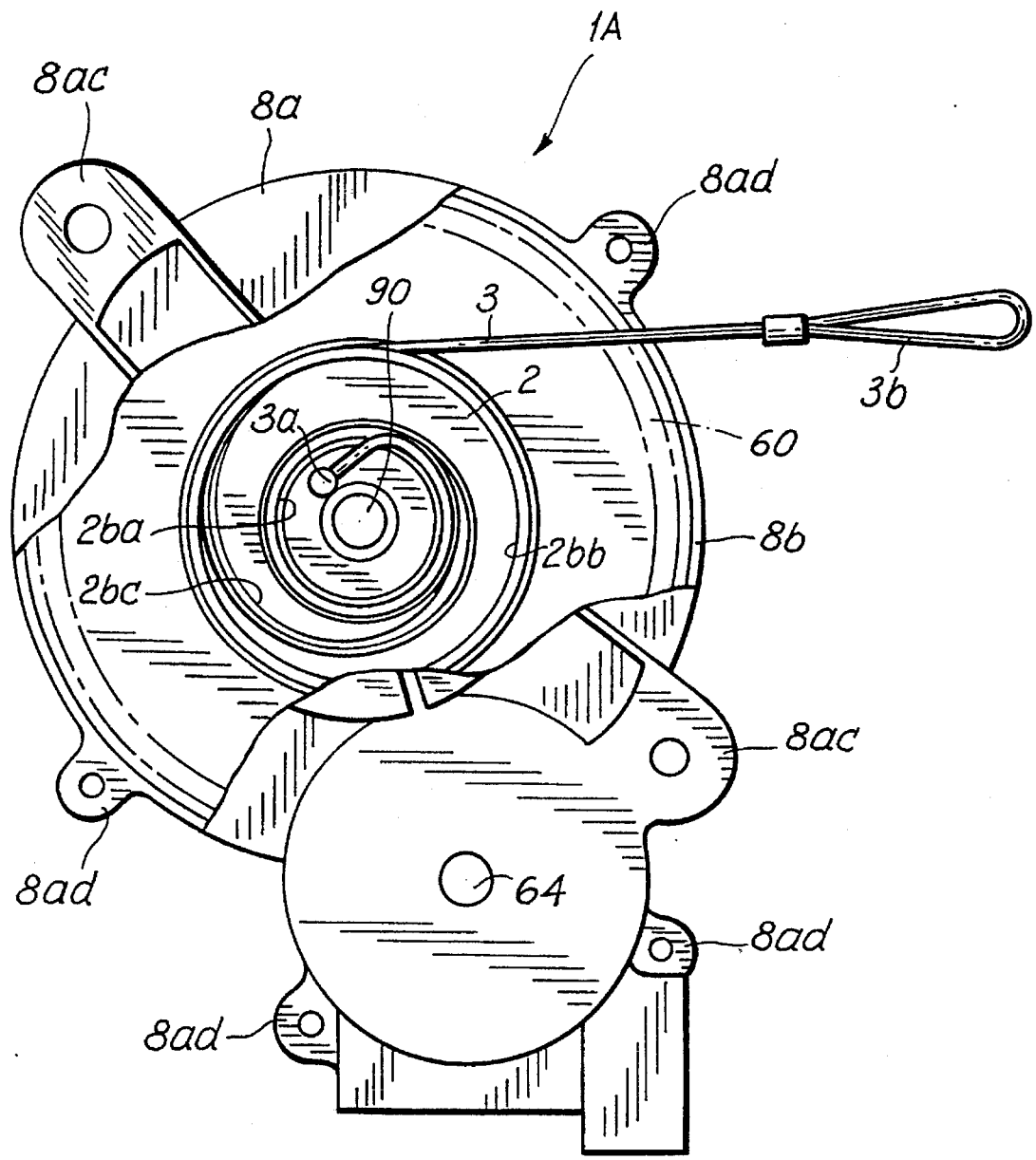
FIG. 10 is a rear view showing the same inner portion for assistance in explaining the way of reeving the long member around the pulley.

With reference to FIGS. 8, 9 and 10, the governor provided with a pulley 1A comprises a pulley 2 rotatably supported by a casing, a wire 3 wound around the pulley 2, a torsional coil spring 4A for urging the pulley in the direction that the wire 3 is wound around the pulley 2, and an eddy current braking means 5A for braking the rotation of the pulley 2. Further, between the braking means 5 and the pulley 2, there are provided a speed up gear train 6 for transmitting the pulley rotation to the braking means 5A and a one-way clutch 7 for restricting the transmission direction of the gear train to one direction.

The casing is composed of a first casing 8a, and a second casing 8b fixed to the first casing 8a so as to be joined together therewith. A support axle 90 is fixedly supported between the first casing 8a and the second casing 8b.

A pulley 2 is rotatably supported by the support axle 90. The pulley 2 is formed with a large diameter gear 60 integral therewith so as to constitute the first stage of the speed up gear train 6. The structure of the pulley 2 will be described with reference to FIG. 11. The pulley 2 is formed with a hole 2a through which the support axle 90 is passed, and a spiral groove 2b extending along a virtual spiral (a long member winding up portion) around which the wire 3 is to be wound.

The pulley 2 is formed with an engage portion 2c communicating with one end of the spiral groove 2b, with which one end portion 3a of the wire 3 is engaged. As shown in FIG. 10, the spiral groove 2b is so formed that the diameter changes from the small diameter portion 2ba (the engage portion 2c at which the wire winding starts) to the maximum diameter portion 2bb. In the case of the spiral groove 2b shown, the small diameter portion 2ba corresponds to two winding portions when counted from the wire winding start, and the large diameter portion 2bb corresponds to two maximum winding portions when counted from the wire winding end. The portion between the small and large diameter portions 2ba and 2bb is a conical diameter winding portion 2bc whose diameter changes relatively greatly and, which is formed as to communicate between both the portions 2ba and 2bb.

Returning to FIG. 8, the first casing 8a is formed with a wire guide 8aa in the close vicinity of the outer circumference of the pulley 2. This wire guide 8aa is formed so as to close the opening portion of the groove 2b for prevention of the wire 3 from being removed from the spiral groove 2b.

Further, as shown in FIGS. 9 and 10, the first casing 8a is formed with two mounting portions 8ac for fixing the governor to a frame body of the baggage shelf. The first and second casings 8a and 8b are fixed with screws by overlapping two opposingly arranged fixing portions 8ad and 8bd.

The other end 3b of the wire 3 is led out from the casing and further linked with the baggage shelf 100, as shown in FIG. 12. When the baggage is placed on the shelf, a part of the wire 3 is wound around the pulley 2.

An axially projecting engage pin 43 is formed at a hollow portion 61 of a large diameter 60. Further, an axially projecting engage pin 44 is formed at a housing portion 8bc formed in the second casing 8b so as to project from the second casing 8b. An end 45 of the torsional coil spring 4A is engaged with the engage pin 43, and the other end 46 thereof is engaged with the engage pin 44. The torsional coil spring 4A is wound by the pulley 2 rotating counterclockwise when the wire 3 is pulled out, as shown by the arrow a in FIG. 9.

The areas of difference between the first and second embodiments in the structure of the pulley are that the housing portion 8bc is formed so as to project for housing the torsional coil spring 4A and further a cylindrical guide 2d is formed in the pulley 2, as shown in FIG. 8.

The torsional coil spring 4A is set to the energy accumulating condition, by engaging both ends thereof with the respective pins and further by fixing the first and second casings 8a and 8b, after the spring 4A has been previously wound up between both the casings rotated relative to each other in the winding up directions. Under these conditions, the coil spring 4A is energized in the direction that the wire 3 is wound up around the pulley 2.

The speed up gear train 6 is composed of a large diameter gear wheel 60 (as the first stage), a small diameter drive gear wheel 61 in mesh with the gear wheel 60, a worm wheel 62 (a driven gear wheel) selectively coupled via a one-way latch 7, and a worm axle 63 rotating in mesh with the worm wheel 62. The worm axle 63 is rotated by the worm wheel 62 driven when the wire is pulled out. The drive gear 61 and the worm wheel 63 are supported by a support axle 64 supported by the casing so as to be rotatable relative to each other.

The structure of the one-way clutch 7 is substantially the same as with the case of the first embodiment, and therefore the same reference numerals have been retained for similar elements or parts which have the same functions, without repeating any description thereof.

Figure 7:
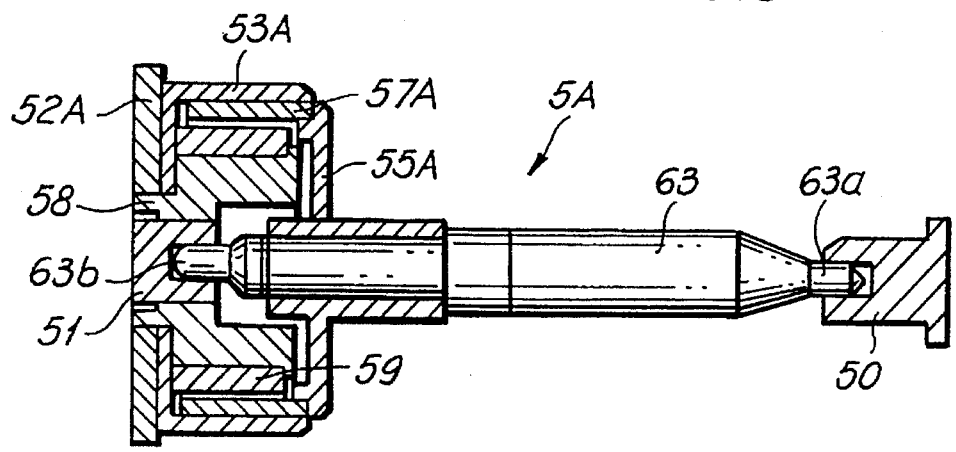
FIG. 7 is a side view showing an example of the eddy current braking means.

With reference to FIGS. 7 and 9, an example of the braking means 5A is explained. The worm axle 63 is rotatably supported by bearings 50 and 51 at both small diameter end portions 63a and 63b thereof. The bearing 50 is held being fitted to a holding portion 8bb formed in the second casing 8b. The bearing 51 is held by a yoke holder 52A and a magnet holder 58 both supported by the second casing 8b so as not to be rotated.

The magnet holder 58 holds a cylindrical magnet 59 at the outer circumference thereof. The yoke holder 52A holds a metallic cup-shaped yoke 53A. In a gap formed between the magnet. 59 and the yoke 53A, a rotor 57A made of copper plate fixed to the worm axle 63 is held with a space between both the magnet. and the yoke. The rotor 57A is fixed to a holder 55A fixed to the worm axle 63, and thereby rotates together with the axle 63. The magnet 59 and the yoke 53A are both fixed to the first casing 8a.

When the rotor 57A rotates across a magnetic field formed between the magnet 59 and the yoke 53A together with the rotation of the worm axle 63, eddy current is generated in the rotor 57A. The generated eddy current increases higher with increasing speed of the rotor 57. The generated eddy current brakes the worm axle 63 to which the rotor is fixed, that is, the gear train connected to the worm axle. The braking means 5A can be replaced with the frictional brake means as shown in FIG. 5.

The operation of the second embodiment thus constructed will be described hereinbelow.

With reference to FIGS. 8 and 10, when the baggage shelf 100 (see FIG. 12) is pivoted downward, the wire 3 is let out from the casing. The let out wire 3 rotates the pulley 2 to wind up the spiral spring 4A; in other word, the energy is accumulated. On the other hand, the large diameter gear wheel 60 formed integral with the pulley 2 rotates the small diameter gear wheel 61 in mesh therewith at a higher speed, so that the worm wheel 62 rotates the worm axle 63 at a high speed.

When the worm axle 63 rotates, the rotor 57A fixed to the worm axle 63 is rotated at a high speed to generate an eddy current, so that the rotation of the worm axle 64 is braked. When the rotational speed of the worm axle 63 decreases, the generated eddy current decreases, so that the braking force also decreases. When the rotational speed of the worm axle 63 increases, the generated eddy current increases, so that the braking force also increases in correspondence to the generated eddy current.

On the other hand, when the baggage shelf 100 is lowered open, the wire 3 is pulled and therefore the pulley 2 is rotated. In this case, the diameter of the pulley 2 around which the wire 3 is wound decreases with the increasing length of the wire 3 pulled out, so that the change in the wire winding diameter varies the opening speed of the baggage shelf 100 as shown by solid lines in FIG. 13.

In more detail, in FIG. 13, immediately after the latch has been released since no braking force of the braking means 5A is generated, the baggage shelf 100 is pivoted at a high speed. However, when the baggage shelf 100 has been pivoted to the brake start position a at which the braking means 5A starts to actuate, the shelf 100 pivots at a lower speed V1. This speed V1 is produced when the braking force is generated by the braking means 5A, under the condition that the wire 3 wound around the winding diameter portion 2bb (see FIG. 10) rotates the pulley 2.

Further, when the let out wire 3 rotates the pulley 2 via the conical diameter portion 2bc, since the wire winding diameter is slightly reduced, the pulley 2 is rotated at another higher speed. Therefore, the rotational speed of the large diameter gear wheel 60 of the first stage of the speed up gear train 6 increases, so that the worm axle 63 of the final stage rotates at a higher speed. Accordingly, a larger braking force is applied to the axle 63, with the result that the baggage shelf 100 is pivoted at a further lower speed V2. This speed V2 is produced when the braking force is generated by the braking means 5, under the condition that the wire 3 wound around the smaller winding diameter portion 2ba rotates the pulley 2.

When the let out wire 3 rotates the pulley 2 via the smaller diameter portion 2ba, the rotational speed of the large diameter gear wheel 60 of the first stage of the speed up gear train 6 becomes the maximum, so that the worm axle 63 is rotated at still another higher speed. Therefore, a large braking force is generated by the braking means 5A, and the speed V2 remains as it is until the baggage shelf 100 is stopped at its full open position. In summary, the baggage shelf 100 is pivoted open first quickly, but slowly midway.

Further, in the above-mentioned embodiment, the spiral groove 2b of the pulley 2 around which the wire 3 is wound is composed of the large diameter portion 2bb, the small diameter portion 2ba and the conical diameter portion 2bc connecting both, so that braking force can be generated in stepwise fashion. Without being limited thereto, however, it is unnecessary to keep the speed V1 constant beginning from the brake start position a; that is, it is also possible to reduce the speed gradually by changing the diameter of the pulley.

In this case, however, since it is preferable that the baggage shelf 100 is pivoted open at a slow speed immediately before being stopped, it is preferable to form the small diameter portion 2ba so as to have the same diameter to some extent.

The operation of raising the baggage shelf 100 lowered as shown by dot-dot-dashed lines in FIG. 12 will now be described. When the baggage shelf is pivoted in the closed direction, no pulling force is applied to the wire 3, so that the let out wire 3 is wound around the pulley 2 urged by the torsional coil spring 4A wound up. In other words, the accumulated energy is released so that the pulley 2 is rotated. At this moment, the large diameter gear wheel 60 formed integral with the pulley 2 rotates the drive gear 61 at a high speed. In this case, since the drive sleeve 70 formed integral with the drive gear wheel 61 rotates in the direction that the coil spring 74 is wound up, the spring 74 is brought away from the inner circumferential surface of the cup 72 without rotating the driven sleeve 71 with the result that the rotational force transmission of the drive gear wheel 61 of the speed up gear train 6 is interrupted by the one-way clutch 7. Therefore, no braking force of the braking means 5 is generated when the wire 3 is being wound up.

In the case where the speed at which the wire is wound up is slower than the speed at which the baggage shelf is closed, although the wire 3 is deformed in the radially outward direction, since he wire guide 8aa is provided in the vicinity of the outer circumference of the pulley 2, the wire 3 will not be removed from the wire winding diameter portion.

In the above-mentioned respective embodiments, the wire winding portion 2b is formed into a groove shape so that the wire 3 wound up around the pulley 2 does not overlap itself. However, it is unnecessary to form the wire winding portion of the pulley, when a winding up member which can prevent the wire from being overlapped is additionally provided at the wire let out portion of the casing. Further, it is also possible to form the wire winding up portion in a spiral stair fashion. In this case, the casing 8aa is formed with a wire guide 8aa (see FIGS. 1 and 8).

Further, in the above-mentioned embodiments, the wire winding up portion 2b is formed so that the diameter changes from a large diameter, through a medium diameter, to a small diameter in the wire let out direction. However, it is possible to change the diameter from a large diameter, through a medium diameter and a large diameter again, to a small diameter, as far as a large braking force can be generated at the small diameter portion of the final stage. In particular, when the movement length of the movable body is long, it is possible to improve the feeling of the movable body by appropriately increasing and decreasing the movement speed of the movable body.

As described above, according to the present invention, since the diameter of the pulley rotated when a long member is let out changes, the rotational speed of the braking means varies according to the let out length of the long member, that is, the movement position of the movable body, so that the feeling of motion of the movable body can be improved because the braking force applied to the movable body changes. Further, in the present invention, since only the diameter of the wire winding up portion is changed without constructing the gear train in a complicated way, the structure is simplified; the cost is lowered; and further the gear noise can be reduced.

While the foregoing description and drawings represent the preferred embodiments of the present invention, it will be obvious to those skilled in the art that various changes and modifications may be made therein without departing from the true spirit and scope of the present invention.

What is claimed is:

1. A governor provided with a pulley comprising:

a casing;

a pulley rotatably supported by said casing;

a long member wound up around said pulley, said pulley being rotated when said long member is pulled;

a spring member for urging said pulley in the direction in which said long member is wound up;

braking means for braking said pulley when said long member is pulled; and a long member winding up portion formed in said pulley so that winding up diameters thereof change as said long member is being pulled out which, in turn, changes the operation of said braking means, wherein said long member winding up portion is a spiral groove describing a virtual spiral and wherein the spiral groove is composed of a small diameter portion of a long member winding up start position, a large diameter portion of a long member winding up end portion, and a conical portion connecting both the small and large diameter portions.

2. The governor provided with a pulley of claim 1, wherein said braking means comprises a speed regulating member expandable by a centrifugal force due to a rotational output of said pulley, and a circumferential wall disposed so as to enclose said regulating member, with which said expanded regulating member is brought into frictional contact.

3. The governor provided with a pulley of claim 1, which further comprises a speed up gear train disposed between said braking means and said pulley for transmitting an increased rotational speed of said pulley to said braking means, and a one-way clutch for restricting rotation direction of said gear train to a predetermined direction.

4. The governor provided with a pulley of claim 1, wherein said spring member is a spiral spring.

5. The governor provided with a pulley of claim 1, wherein said braking means comprises a cylindrical magnet, a metallic cup-shaped yoke disposed with a gap away from said magnet, and a rotor disposed between said magnet and said yoke and rotated according to the rotational output of said pulley.

6. The governor provided with a pulley of claim 1, wherein said spring member is a torsional coil spring.

7. The governor of claim 1, wherein said casing is formed with a wire guide in close vicinity of an outer circumference of said pulley.

\* \* \* \* \*